United States Patent
Osamura

(10) Patent No.: US 9,676,293 B2
(45) Date of Patent: Jun. 13, 2017

(54) DRIVING FORCE CONTROLLER FOR ELECTRIC VEHICLE

(71) Applicant: CALSONIC KANSEI CORPORATION, Saitama (JP)

(72) Inventor: Kensuke Osamura, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 0 days.

(21) Appl. No.: 14/786,361

(22) PCT Filed: Mar. 10, 2014

(86) PCT No.: PCT/JP2014/056198
§ 371 (c)(1),
(2) Date: Oct. 22, 2015

(87) PCT Pub. No.: WO2014/174922
PCT Pub. Date: Oct. 30, 2014

(65) Prior Publication Data
US 2016/0068078 A1    Mar. 10, 2016

(30) Foreign Application Priority Data

Apr. 23, 2013 (JP) ................................ 2013-090051

(51) Int. Cl.
*B60L 15/36* (2006.01)
*B60L 15/20* (2006.01)
*B60L 11/18* (2006.01)

(52) U.S. Cl.
CPC ........... *B60L 15/20* (2013.01); *B60L 11/1851* (2013.01); *Y02T 10/645* (2013.01); *Y02T 10/7275* (2013.01)

(58) Field of Classification Search
CPC combination set(s) only.
See application file for complete search history.

(56) References Cited

U.S. PATENT DOCUMENTS 6,727,670 B1 * 4/2004 Grabowski ......... B60L 11/1861
318/139
2005/0110498 A1    5/2005 Plett
(Continued)

FOREIGN PATENT DOCUMENTS

JP    2006-223073 A    8/2006
JP    2007-20244 A    1/2007
(Continued)

OTHER PUBLICATIONS

International Search Report and Written Opinion of the International Search Report for PCT/JP2014/056198 dated Apr. 28, 2014.

*Primary Examiner* — Edward J Pipala
(74) *Attorney, Agent, or Firm* — Kenealy Vaidya LLP

(57) ABSTRACT

An electric vehicle driving force control device capable of decreasing discrepancy generated between a driver's acceleration pedal operation and output torque actually generated by a drive motor is provided. The electric vehicle driving force control device includes target torque setting unit 5, 7, 8, 9, and 10 for setting target torque by limiting an upper limit of a target torque basic value from the target torque basic value and the maximum discharge power equivalent motor torque. The target torque setting unit corrects the target torque basic value such that, on a graph indicating a relationship between an acceleration opening and the target torque, an acceleration opening generating a limited target torque shifts to an acceleration opening side greater than the acceleration opening, and target torque smaller than the target torque basic value is generated in an accelerator opening region which is smaller than the limited accelerator opening.

4 Claims, 6 Drawing Sheets

(56) References Cited

U.S. PATENT DOCUMENTS

| | | |
|---|---|---|
| 2007/0007058 A1 | 1/2007 | Uenodai et al. |
| 2010/0087288 A1* | 4/2010 | Yamamoto ............. B60K 6/445 477/3 |
| 2013/0154360 A1 | 6/2013 | Ito |

FOREIGN PATENT DOCUMENTS

| | | |
|---|---|---|
| JP | 2007-517190 A | 6/2007 |
| JP | 2012-50158 A | 3/2012 |

* cited by examiner

DRIVING FORCE CONTROLLER FOR ELECTRIC VEHICLE

TECHNICAL FIELD

The present invention relates to an electric vehicle driving force control device which limits output torque by considering the maximum discharge power of a battery.

BACKGROUND ART

An electric vehicle driving force control device of the related art is disclosed in Patent Document 1.

In the electric vehicle driving force control device of the related art, the maximum discharge power of a battery pack is estimated using progress cell model prediction technology, and the maximum output of a drive motor is limited based on the estimated value.

In the estimation of the maximum discharge power, the maximum discharge current of a battery is calculated based on a voltage limit and a discharge state limit of the battery, and the maximum discharge current of the battery is calculated based on the current limit of the battery. The maximum discharge voltage is calculated from the minimum valve of the discharge currents which are selected from the maximum discharge current calculated based on the voltage limit, the maximum discharge current calculated based on the discharge state limit, and the maximum discharge current calculated based on the current limit.

RELATED DOCUMENTS

Patent Documents

Patent Document 1: JP-T-2007-517190

SUMMARY OF THE INVENTION

Problems that the Invention is to Solve

However, in the electric vehicle driving force control device of the related art, there are problems described below.

A configuration of a drive control device of the related art is shown in a block diagram of FIG. 5.

That is, the maximum discharge power calculated by a maximum discharge power calculation section 101 and a rotating speed of a drive motor detected by a rotating speed detection section 102 are input to a division section 104, the maximum discharge power is divided by the rotating speed, and maximum discharge power equivalent motor torque is calculated. The maximum discharge power equivalent motor torque is input to a select low section 106.

Meanwhile, the rotating speed of the drive motor detected by the motor rotating speed detection section 102, and an accelerator opening detected by an accelerator opening detection section 103 are input to a target motor torque calculation section 105.

The target motor torque calculation section 105 has a map data in which a relationship between a drive motor rotating speed and a target motor torque is set according to a size of an accelerator opening, the target motor torque is determined according to the accelerator opening and the rotating speed of the drive motor, and the target motor torque is set to be a target torque basic value. The target basic value is input to the select low section 106.

The select low section 106 selects the smaller one of the maximum discharge power equivalent motor torque input from the division section 104, and the target torque basic value input from the target motor torque calculation section 105, and outputs the smaller one as the target torque of the drive motor.

Accordingly, for example, relationships among the drive motor rotating speed, the target motor torque, and the accelerator opening are shown as FIG. 6A. In FIG. 6B, a dashed line indicates the maximum discharge power.

That is, in a portion above a maximum discharge power line, since the target torque basic value is greater than the maximum discharge power equivalent motor torque, the target torque basic value is limited to a magnitude of the maximum discharge power equivalent motor torque by the select low section 106. Inversely, in a portion below the maximum discharge power line, the target torque basic value is set to a target torque as it is.

In other words, when the drive motor rotates at a rotating speed (shown by a vertical dotted line in FIG. 6A), an accelerator opening at an intersection point (shown by a white circle) between a line of the rotating speed and the maximum discharge power line becomes a branch point at selection of the target torque.

Accordingly, in the rotating speed, the target motor torque of the drive motor is changed according to the size of the accelerator opening. A target motor torque basic value at an accelerator opening equal to or less than the accelerator opening at the intersection point shown by a white circle becomes values such as T5, T4, or T3, and the value becomes target torque as it is. In an accelerator opening greater than the accelerator opening at the intersection point shown by the white circle, even when the target motor torque basic value becomes T2, T1, or the like, the basic value is suppressed so as to be the target torque T3.

In addition, an intersection point between a line of a rotating speed and a line indicating a target torque at each representative accelerator opening is shown by a black circle, and each intersection point of FIG. 6A is coincident with an intersection point of FIG. 6B.

As a result, as shown in FIG. 6B, when an accelerator opening is smaller than the accelerator opening shown by the white circle, the target torque is the same value as the target torque basic value, and the target torque gradually increases as the accelerator opening increases.

However, the accelerator opening is equal to or more than the accelerator opening by the white circle (in FIGS. 6A and 6B, an opening between 4/8 opening and 5/8 opening), the target torque is limited to T3, and even the target torque basic value increases according to a further increase of the accelerator opening, the target torque is saturated at T3 and does not increase.

Accordingly, when an accelerator pedal is depressed by a depression amount equivalent to a half strength during acceleration or the like, the target torque basic value reaches the maximum discharge power equivalent motor torque at this time, maximum discharge power equivalent torque is selected as the target torque, and the output is limited. Therefore, even when a driver further depresses the accelerator pedal, torque generated does not actually increase.

As a result, the driver's intention is not reflected by the actual torque, driveability deteriorates, and there is a problem that a driver feels discrepancy.

The present invention is made in consideration of the above-described problems, and an object thereof is to provide an electric vehicle driving force control device which decreases the discrepancy generated between a driver's acceleration pedal operation and output torque actually generated by the drive motor.

Means for Solving the Problems

In order to attain this object, an electric vehicle driving force control device of the present invention includes:

a motor rotating speed detection unit configured to detect a motor rotating speed of a drive motor which drives an electric vehicle;

a battery maximum discharge power estimation unit configured to estimate maximum discharge power of a battery;

an accelerator opening detection unit configured to detect an accelerator opening;

a target torque basic value calculation unit configured to calculate a target torque basic value of the drive motor based on the motor rotating speed detected by the motor rotating speed detection unit and the accelerator opening detected by the accelerator opening detection unit;

a maximum discharge power equivalent motor torque calculation unit configured to calculate maximum discharge power equivalent motor torque by dividing the maximum discharge power estimated by the battery maximum discharge power estimation unit by the motor rotating speed detected by the motor rotating speed detection unit; and target torque setting unit configured to set target torque of the drive motor by limiting an upper limit of the target torque basic value based on the target torque basic value calculated by the target torque basic value calculation unit and the maximum discharge power equivalent motor torque calculated by the maximum discharge power equivalent motor torque calculation unit, wherein wherein the target torque setting unit includes a target torque basic value correction unit for correcting the target torque basic value such that, on a graph indicating a relationship between the acceleration opening and the target torque, an acceleration opening generating the limited target torque shifts to an acceleration opening side greater than the acceleration opening, and target torque smaller than the target torque basic value is generated in an accelerator opening region which is smaller than the accelerator opening generating the limited target torque.

Advantages of the Invention

According to an electric vehicle driving force control device of the present invention, an accelerator opening, by which an upper limit of a target torque basic value is limited by a target torque basic value correction unit, is shifted to a greater accelerator opening side. Accordingly, when the accelerator opening increases, it is possible to increase target torque to a full accelerator opening or the vicinity of the full accelerator opening, and it is possible to increase output torque generated by the drive motor. As a result, it is possible to decrease discrepancy between a driver's acceleration pedal operation and output torque actually generated by a drive motor.

MODES FOR CARRYING OUT THE INVENTION

Figure 1:
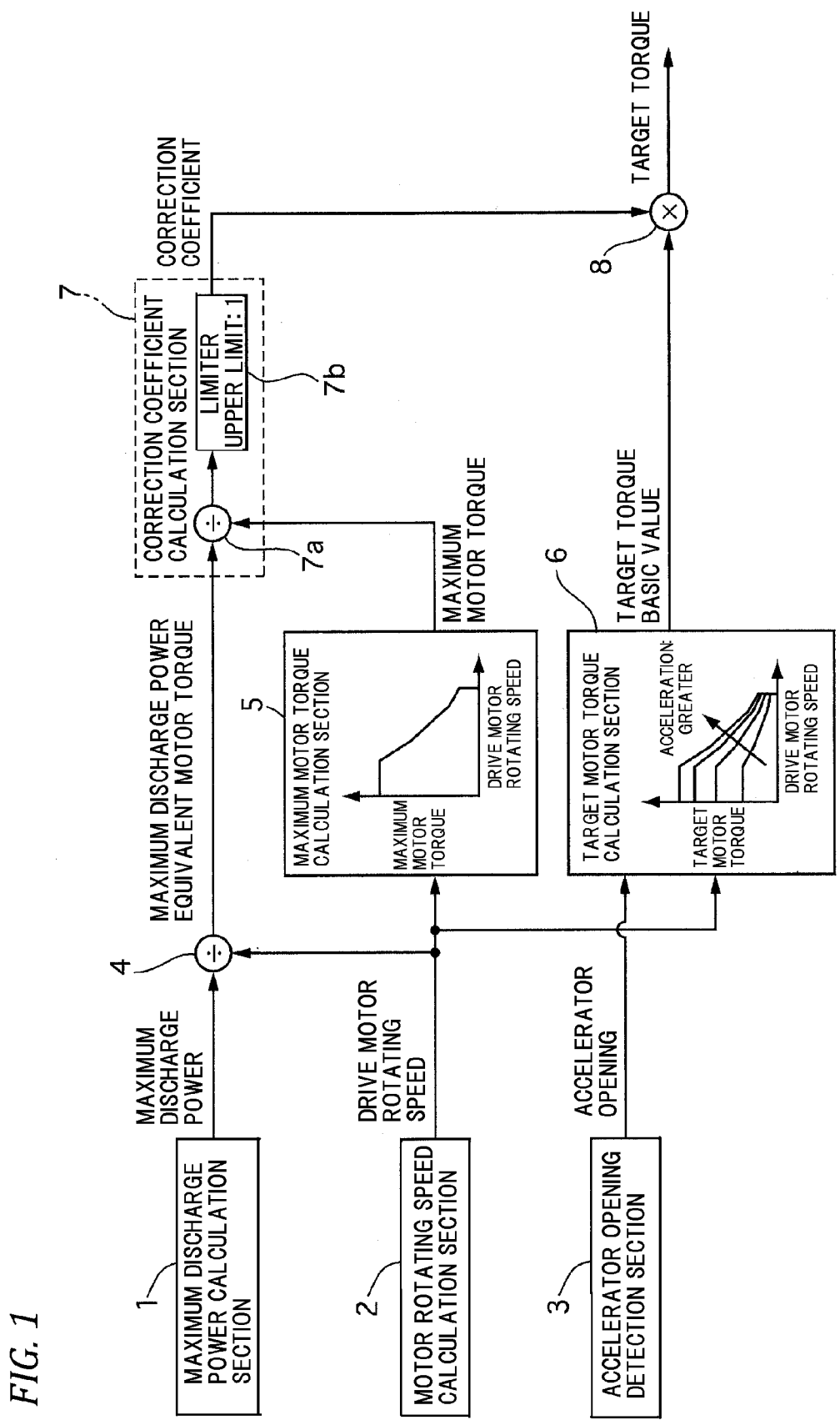
FIG. 1 is a block diagram showing a configuration of an electric vehicle driving force control device of Example 1 of the present invention.

Hereinafter, embodiments of the present invention will be described in detail based on examples shown in the drawings.

In addition, the same reference numerals are assigned to substantially the same portions in all examples, and descriptions thereof are omitted.

Example 1

First, an overall configuration of an electric vehicle driving force control device of Example 1 will be described. As shown in FIG. 1, the electric vehicle driving force control device of Example 1 includes a maximum discharge power calculation section 1, a motor rotating speed detection section 2, an accelerator opening detection section 3, a division section 4, a maximum motor torque calculation section 5, a target motor torque calculation section 6, a correction coefficient calculation section 7, and a multiplication section 8.

The maximum discharge power calculation section 1 calculates the maximum discharge power of a battery (not shown) mounted on a vehicle. For example, the maximum discharge power calculation section 1 performs calculation similar to the above-described related art. The maximum discharge power obtained by the calculation is input to the division section 4.

In addition, the maximum discharge power calculation section 1 corresponds to a battery maximum discharge power estimation unit of the present invention.

The motor rotating speed detection section 2 detects a rotating speed of a drive motor (not shown) which is mounted on a vehicle and drives an electric vehicle. The rotating speed of the drive motor is input to each of the division section 4, the maximum motor torque calculation section 5, and the target motor torque calculation section 6.

In addition, the motor rotating speed detection section 2 corresponds to a motor rotating speed detection unit of the present invention.

The acceleration opening detection section 3 detects an accelerator opening corresponding to a depression amount of an accelerator pedal (not shown). The accelerator opening detected by the accelerator opening detection section 3 is input to the target motor torque calculation section 6.

In addition, the accelerator opening detection section 3 corresponds to an accelerator opening detection unit of the present invention.

The division section 4 obtains the maximum discharge power equivalent motor torque by dividing the maximum discharge power input from the maximum discharge power calculation section 1 by the rotating speed of the drive motor input from the motor rotating speed detection section 2. The maximum discharge power equivalent motor torque is input to the correction coefficient calculation section 7.

In addition, the division section 4 corresponds to a maximum discharge power equivalent motor torque calculation unit of the present invention.

The maximum motor torque calculation section 5 stores data with respect to a relationship between the rotating speed of the drive motor and the maximum motor torque capable of being generated by the rotating speed using the drive motor in a map, and obtains the maximum motor torque corresponding to the rotating speed of the drive motor detected by the motor rotating speed detection section 2. This maximum motor torque is input to the correction coefficient calculation section 7.

In addition, the maximum motor torque calculation section 5 corresponds to a maximum motor torque calculation unit of the present invention.

The target motor torque calculation section 6 stores data with respect to a relationship between the rotating speed of the drive motor and the target motor torque in a map, and obtains target motor torque corresponding to the rotating speed of the drive motor detected by the motor rotating speed detection section 2 and the accelerator opening detected by the accelerator opening detection section 3. This target motor torque is input to the multiplication section 8 as a target torque basic value.

In addition, the target motor torque calculation section 6 corresponds to a target torque basic value calculation unit of the present invention.

The correction coefficient calculation section 7 includes a division section 7a and a limiter 7b.

The division section 7a obtains a torque ratio by dividing the maximum discharge power equivalent motor torque input from the division section 4 by the maximum motor torque calculated by the maximum motor torque calculation section 5. This torque ratio is input to the limiter 7b.

When the torque ratio calculated by the division section 7a is 1 or less, the limiter 7b outputs the torque ratio as it is, and when the torque ratio exceeds 1, the limiter 7b outputs all torque ratios as 1. That is, the torque ratio in which an upper limit is suppressed so as to be 1 is output as a correction coefficient from the limiter 7b, and is input to the multiplication section 8.

In addition, the correction coefficient calculation section 7 corresponds to a correction coefficient calculation unit of the present invention.

The multiplication section 8 obtains target torque by multiplying the target torque basic value calculated by the target motor torque calculation section 6 by the correction coefficient calculated by the correction coefficient calculation section 7. This target torque is input to a motor control section (not shown), and the motor control section controls the drive motor so that the target torque is generated.

In addition, the maximum motor torque calculation section 5, the multiplication section 8, and the correction coefficient calculation section 7 corresponds to a target torque setting unit and a target torque basic value correction unit of the present invention.

Figure 2B:
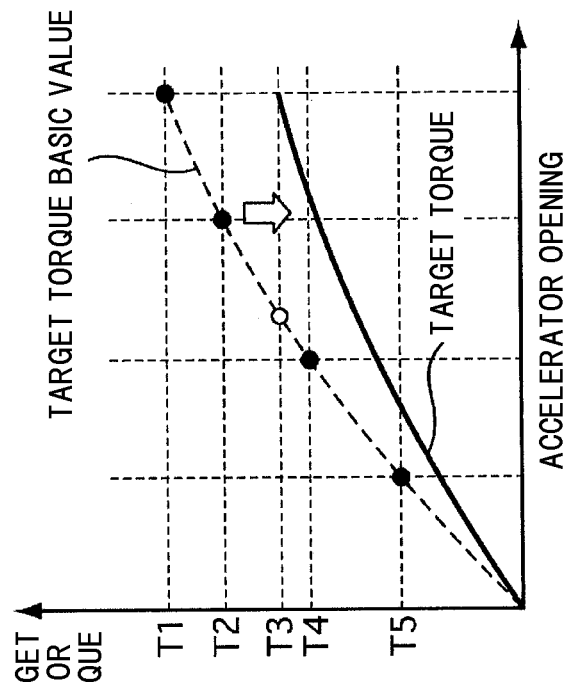
FIG. 2B is a diagram showing a relationship between an accelerator opening and the target motor torque.
Figure 2A:
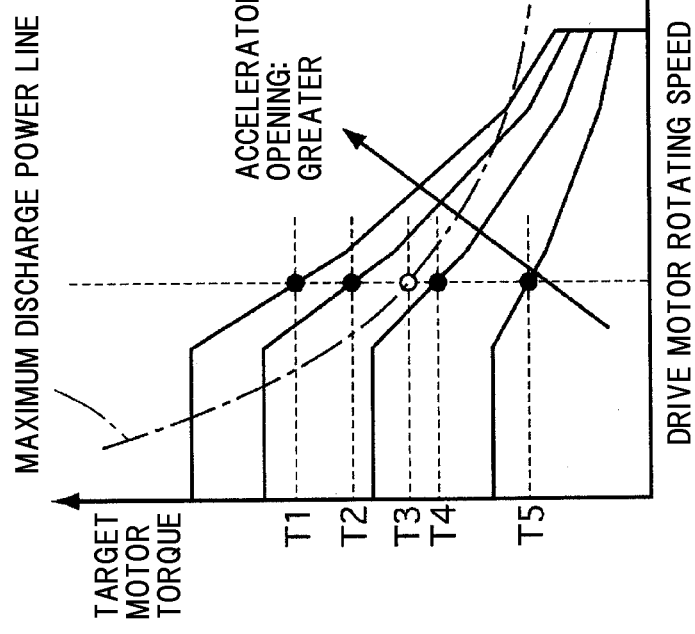
FIG. 2A is a diagram showing a relationship between a driving motor rotating speed and target motor torque in the electric vehicle driving force control device of Example 1.

Here, in the driving force control device configured as described above, the target torque is determined as shown in FIGS. 2A and 2B.

Figure 6B:
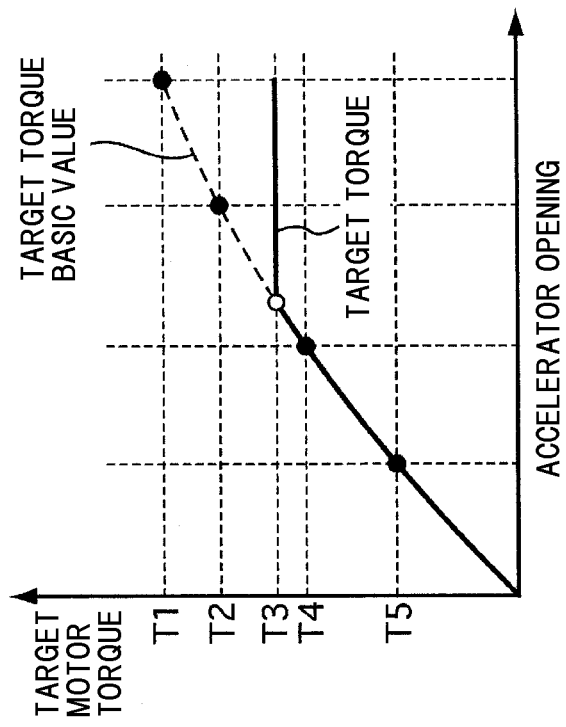
FIG. 6B is a diagram showing a relationship between an accelerator opening and the target motor torque.
Figure 6A:
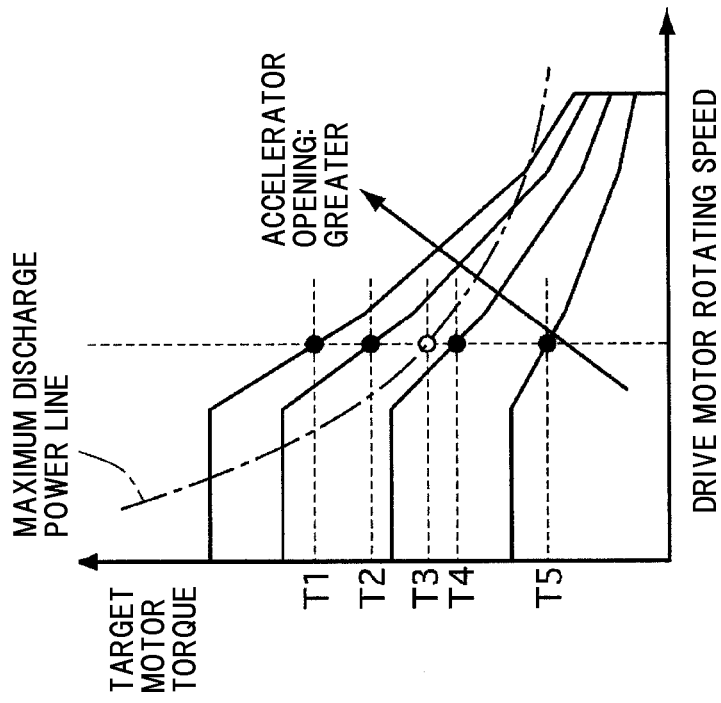
FIG. 6A is a diagram showing a relationship between a driving motor rotating speed and target motor torque in the electric vehicle driving force control device of the related art of FIG. 5.

That is, similar to the case of FIG. 6A, in FIG. 2A, in a region equal to or more than a limit accelerator opening (opening between 4/8 and 5/8, that is, opening of half-strength) shown by a white circle in a certain drive motor rotating speed, the target torque basic value is equal to or more than the maximum discharge power equivalent motor torque.

However, in the driving force control device of Example 1, the correction coefficient calculation section 7 divides the maximum discharge power equivalent motor torque by the maximum motor torque and calculates a correction coefficient by which an upper limit of the divided value is suppressed so as to be less than or equal to 1, and the multiplication section 8 multiplies the target torque basic value by the correction coefficient. Accordingly, a limited accelerator opening is corrected so as to be a greater opening.

As a result, as shown in FIG. 2B, the target torque with respect to the accelerator opening is smaller than the target torque basic value overall by a value obtained by multiplying the target torque basic value by the correction coefficient, and target torque at a position of a full accelerator opening (8/8 opening) which is a maximum accelerator opening is coincident with the maximum discharge power equivalent motor torque.

Accordingly, the target torque basic value is not limited over the entire region, and actual drive torque which is generated by the drive motor according to depression of the accelerator opening by a driver sequentially increases to the full accelerator opening. Accordingly, discrepancy of torque generated by the drive motor with respect to the depression amount of the accelerator pedal does not occur.

As described above, in the electric vehicle driving force control device of Example 1, it is possible to decrease the occurrence of discrepancy between an accelerator pedal operation of a driver and output torque actually generated by the drive motor.

In addition, the output torque generated by the drive motor can smoothly increase according to an increase of the accelerator opening over the entire accelerator opening using a simple configuration which multiplies the target torque basic value by the correction coefficient.

By setting a shifting destination of the accelerator opening generating the limited target torque to the full accelerator opening position, it is possible to continuously increase the output torque of the drive motor to the full accelerator opening without saturating the output torque of the drive motor, and it is possible to obtain improved driveability.

Example 2

Figure 3:
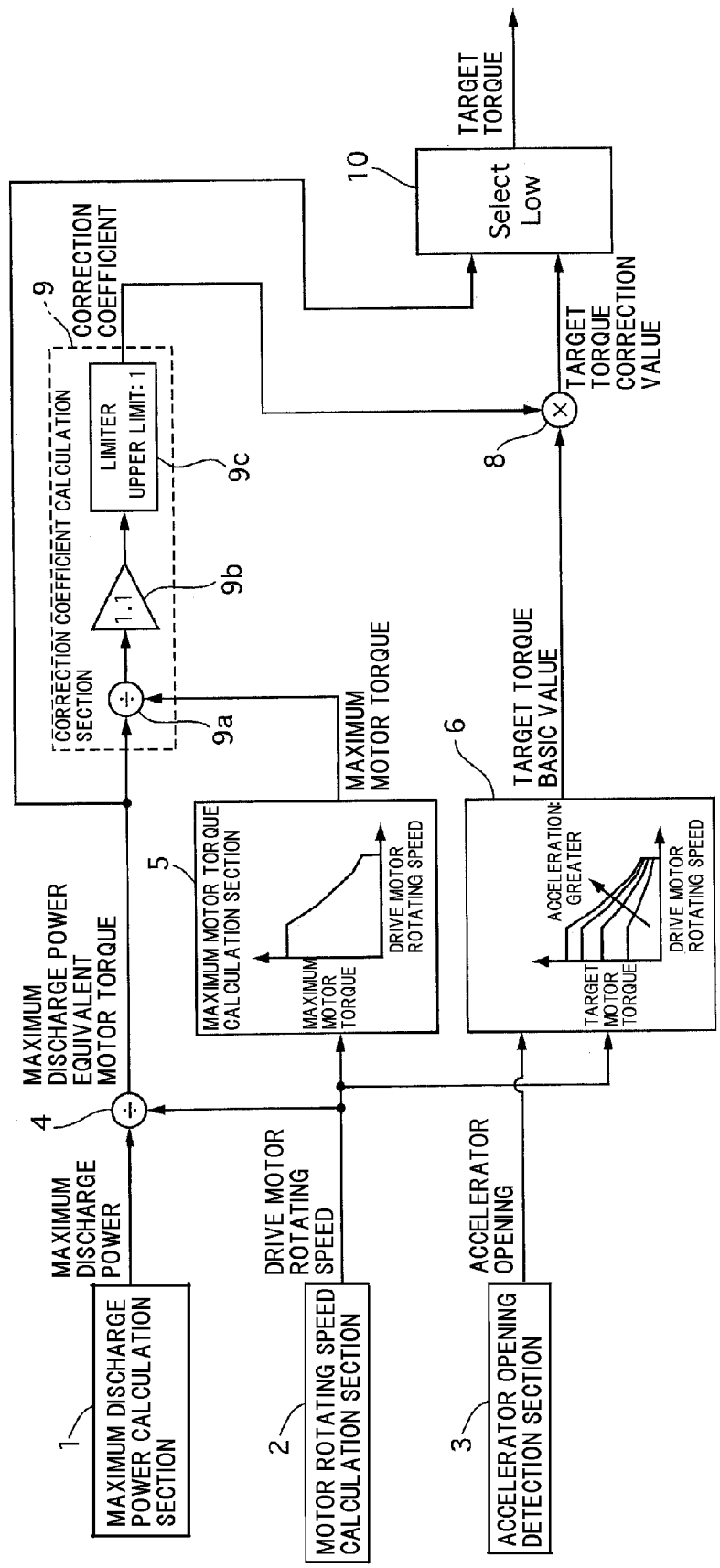
FIG. 3 is a block diagram showing a configuration of an electric vehicle driving force control device of Example 2 of the present invention.

As shown in FIG. 3, an electric vehicle driving force control device of Example 2 according to the present invention is different from that of Example 1 in that a configuration of a correction coefficient calculation section 9 and a select low section 10 are newly added.

In addition, the correction coefficient calculation section 9 corresponds to the correction coefficient calculation means of the present invention. The select low section 10 corresponds to the target torque basic value correction means of the present invention.

The correction coefficient calculation section 9 includes a division section 9a, a coefficient multiplication section 9b, and a limiter 9c.

Similar to the case of the division section 7a of Example 1, the division section 9a obtains a torque ratio by dividing the maximum discharge power equivalent motor torque input from the division section 4 by the maximum motor torque calculated by the maximum motor torque calculation section 5. This torque ratio is input to the coefficient multiplication section 9*b*.

The coefficient multiplication section 9*b* obtains a correction torque ratio by multiplying the torque ratio obtained by the division section 9*a* by a coefficient 1.1. The correction torque ratio is input to the limiter 9*c*. Here, the value of the coefficient is set so as to be greater than 1 but to also be close to 1. Since Example 2 becomes like the related art if the value is set so as to be a value significantly greater than 1, the value of the coefficient is set so as to avoid a value significantly greater than 1.

When the correction torque ratio calculated by the coefficient multiplication section 9*b* is less than or equal to 1, the limiter 9*c* outputs the correction torque ratio as it is. Similarly to the case of the limiter 7*b* of Example 1, when the torque ratio in which the coefficient is multiplied is equal to or more than 1, the limiter 9*c* outputs all torque ratios as 1. The torque ratio in which an upper limit is suppressed so as to be 1 is output from the limiter 9*c*, and is input to the multiplication section 8.

Similar to the case of Example 1, the multiplication section 8 obtains a target torque correction value by multiplying the target torque basic value input from the target motor torque calculation section 6 by the correction coefficient obtained by the correction coefficient calculation section 9. This target torque correction value is input to the select low section 10.

The select low section 10 outputs the smaller one of the maximum discharge power equivalent motor torque input from the division section 4 and the target torque correction value input from the multiplication section 8 as a target torque.

The target torque is input to the motor control section (not shown), and the motor control section controls the drive motor so that the target torque is generated. In addition, other configurations are the same as those of Example 1.

Figure 4B:
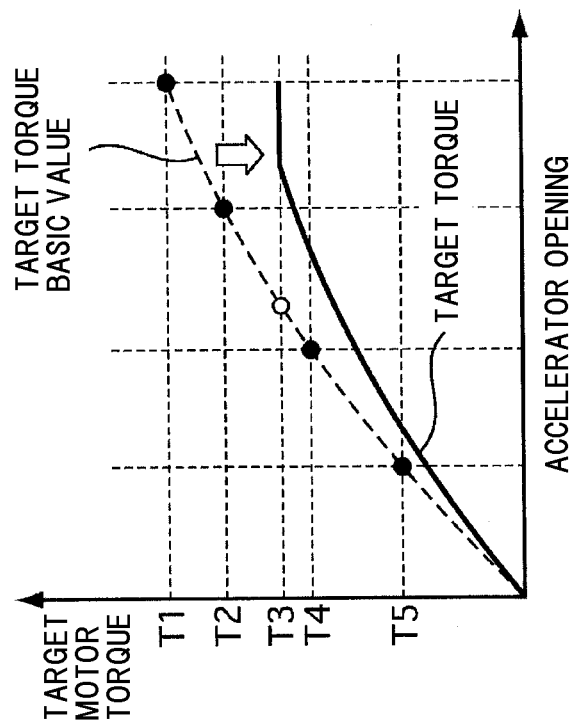
FIG. 4B is a diagram showing a relationship between an accelerator opening and the target motor torque.
Figure 4A:
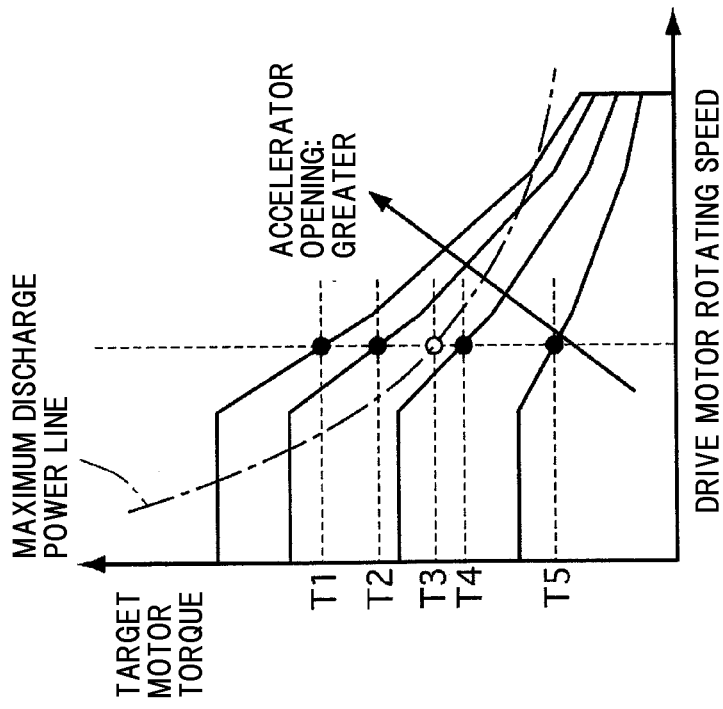
FIG. 4A is a diagram showing a relationship between a driving motor rotating speed and target motor torque in the electric vehicle driving force control device of Example 2.
Figure 5:
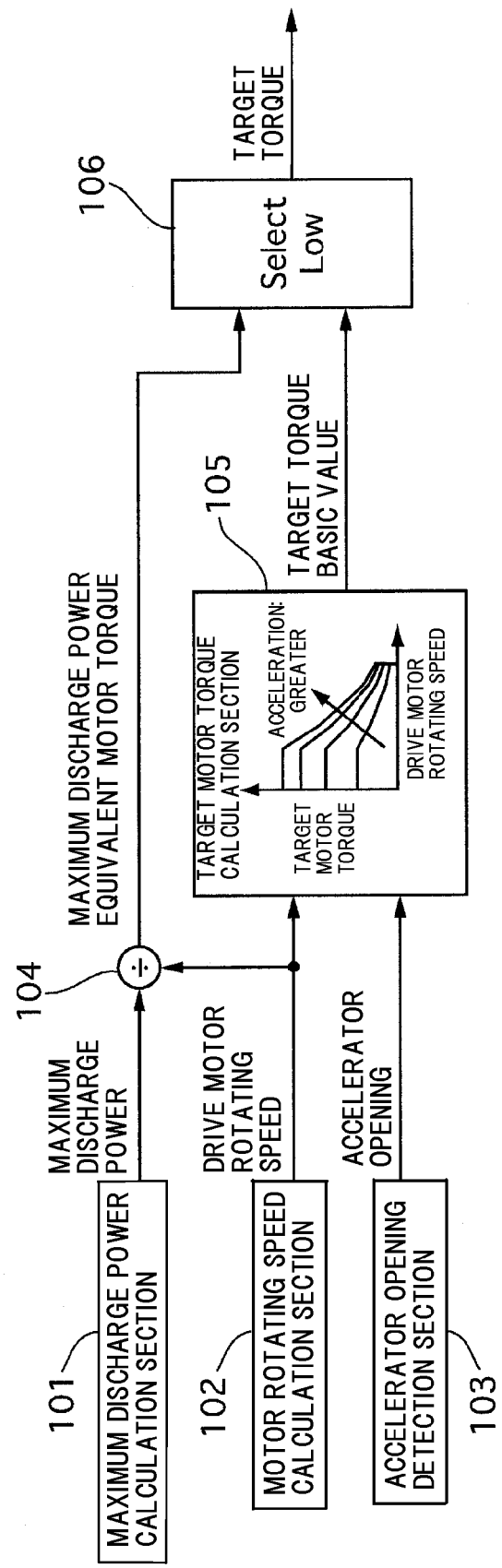
FIG. 5 is a block diagram showing a configuration of an electric vehicle driving force control device of the related art.

Here, in the driving force control device configured as described above, the target torque is determined as shown in FIGS. 4A and 4B.

Similar to FIG. 2A, FIG. 4A shows a relationship between a drive motor rotating speed and a target motor torque for each accelerator opening, and the target motor torque at a certain drive motor rotating speed.

As shown in FIG. 4B, in Example 2, in a region of an accelerator opening which is greater than a side (a side immediately before 7/8 opening in Example 2) immediately before the full accelerator opening, the target torque is limited and saturated. However, the accelerator opening at which the target torque basic value is limited is greater than the accelerator opening of the related art (in the related art, the accelerator opening is limited and saturated in a region equal to or more than 4/8 opening strength). In this way, even when the output torque is limited before the full accelerator opening, the output torque is close to the full accelerator opening. Accordingly, discrepancy of a driver does not occur or considerably decreases.

Meanwhile, in a region of the accelerator opening which is smaller than the accelerator opening, the target torque also sequentially increases according to an increase of the accelerator opening.

In this case, since the correction coefficient calculation section 9 multiplies the torque ratio by a coefficient greater than 1, when the accelerator opening is a low opening or an intermediate opening, it is possible to decrease separation between a value in which the torque basic value is corrected and the target torque (in the low and intermediate openings, the target torque increases compared to the case of Example 1), and driveability is improved in the low and intermediate openings.

As described above, in the electric vehicle driving force control device of Example 2, in addition to effects similar to those of Example 1, since driveability can be improved in the low and intermediate openings of the accelerator opening, it is possible to decrease the discrepancy of a driver.

Hereinbefore, the present invention is described based on Examples. However, the present invention is not limited to Examples, and also includes a case where design modifications or the like are performed within a range which does not depart from the gist of the present invention.

In addition, the present application is based on Japanese Patent Application (Japanese Patent Application No. 2013-090051) filed Apr. 23, 2013, the entire contents of which are incorporated herein by reference. In addition, all references cited herein are incorporated as a whole.

DESCRIPTION OF REFERENCE NUMERALS AND SIGNS

1: maximum discharge power calculation section (battery maximum discharge power estimation unit)
2: motor rotating speed detection section (motor rotating speed detection unit)
3: accelerator opening detection section (accelerator opening detection unit)
4: division section (maximum discharge power equivalent motor torque calculation unit)
5: maximum motor torque calculation section (maximum motor torque calculation unit, target torque basic value correction unit)
6: target motor torque calculation section (target torque basic value calculation unit)
7: correction coefficient calculation section (correction coefficient calculation unit, target torque basic value correction unit)
7*a*: division section (correction coefficient calculation unit)
7*b*: limiter (correction coefficient calculation unit)
8: multiplication section (target torque setting unit, target torque basic value correction unit)
9: correction coefficient calculation section (correction coefficient calculation unit, target torque basic value correction unit)
9*a*: division section (correction coefficient calculation unit)
9*b*: coefficient multiplication section (correction coefficient calculation unit)
9*c*: limiter (correction coefficient calculation unit)
10: select low section (target torque basic value correction unit)

The invention claimed is:
1. An electric vehicle driving force control device comprising:
   a motor rotating speed detection unit configured to detect a motor rotating speed of a drive motor which drives an electric vehicle;
   a battery maximum discharge power estimation unit configured to estimate maximum discharge power of a battery;
   an accelerator opening detection unit configured to detect an accelerator opening;
   a target torque basic value calculation unit configured to calculate a target torque basic value of the drive motor based on the motor rotating speed detected by the motor rotating speed detection unit and the accelerator opening detected by the accelerator opening detection unit;

a maximum discharge power equivalent motor torque calculation unit configured to calculate maximum discharge power equivalent motor torque by dividing the maximum discharge power estimated by the battery maximum discharge power estimation unit by the motor rotating speed detected by the motor rotating speed detection unit; and target torque setting unit configured to set target torque of the drive motor by limiting an upper limit of the target torque basic value based on the target torque basic value calculated by the target torque basic value calculation unit and the maximum discharge power equivalent motor torque calculated by the maximum discharge power equivalent motor torque calculation unit, wherein the target torque setting unit includes a target torque basic value correction unit for correcting the target torque basic value such that, on a graph indicating a relationship between the acceleration opening and the target torque, an acceleration opening generating the limited target torque shifts to an acceleration opening side greater than the acceleration opening, and target torque smaller than the target torque basic value is generated in an accelerator opening region which is smaller than the accelerator opening generating the limited target torque.

2. The electric vehicle driving force control device according to claim 1, wherein a shifting destination of the accelerator opening, generating the limited target torque, is set to a full accelerator opening position.

3. The electric vehicle driving force control device according to claim 1, wherein the target torque basic value correction unit includes, a maximum motor torque calculation unit configured to calculate maximum motor torque capable of being generated by the drive motor, based on the motor rotating speed detected by the motor rotating speed detection unit, and a correction coefficient calculation unit configured to obtain a torque ratio by dividing the maximum discharge power equivalent motor torque calculated by the maximum discharge power equivalent motor torque calculation unit by the maximum motor torque calculated by the maximum motor torque calculation unit, and for calculating a correction coefficient by which an upper limit of the torque ratio is suppressed to be less than or equal to 1, wherein the target torque is obtained by multiplying the correction coefficient calculated by the correction coefficient calculation unit by the target torque basic value calculated by the target torque basic value calculation unit.

4. The electric vehicle driving force control device according to claim 1, wherein the target torque basic value correction unit includes, a maximum motor torque calculation unit configured to calculate maximum motor torque capable of being generated by the drive motor, based on the motor rotating speed detected by the motor rotating speed detection unit, and a correction coefficient calculation unit configured to obtain a torque ratio by dividing the maximum discharge power equivalent motor torque calculated by the maximum discharge power equivalent motor torque calculation unit by the maximum motor torque calculated by the maximum motor torque calculation unit, and for calculating a correction coefficient by which an upper limit of a value obtained by multiplying the torque ratio by a value, which is greater than 1 and close to 1, is suppressed to be less than or equal to 1, wherein a smaller value of a value obtained by multiplying the correction coefficient calculated by the correction coefficient calculation unit by the target torque basic value calculated by the target torque basic value calculation unit, and the maximum discharge power equivalent motor torque is set to the target torque.

* * * * *